(12) United States Patent
Bist et al.

(10) Patent No.: US 11,102,463 B2
(45) Date of Patent: Aug. 24, 2021

(54) METHOD FOR PROCESSING AN INPUT IMAGE, DEVICE, TERMINAL EQUIPMENT AND ASSOCIATED COMPUTER PROGRAM

(71) Applicant: B<>COM, Cesson Sevigne (FR)

(72) Inventors: Cambodge Bist, Karlsruhe (DE); Remi Cozot, Calais (FR); Gerard Madec, Chasne sur Illet (FR)

(73) Assignee: B<>COM

( * ) Notice: Subject to any disclaimer, the term of this patent is extended or adjusted under 35 U.S.C. 154(b) by 0 days.

(21) Appl. No.: 16/483,306

(22) PCT Filed: Jan. 17, 2018

(86) PCT No.: PCT/FR2018/050115
§ 371 (c)(1),
(2) Date: Aug. 2, 2019

(87) PCT Pub. No.: WO2018/142040
PCT Pub. Date: Aug. 9, 2018

(65) Prior Publication Data
US 2020/0007839 A1 Jan. 2, 2020

(30) Foreign Application Priority Data

Feb. 3, 2017 (FR) ...................................... 1750937

(51) Int. Cl.
*H04N 9/77* (2006.01)
*G06T 5/00* (2006.01)
(Continued)

(52) U.S. Cl.
CPC .............. *H04N 9/77* (2013.01); *G06T 5/009* (2013.01); *H04N 5/57* (2013.01); *H04N 9/67* (2013.01);
(Continued)

(58) Field of Classification Search
CPC ..... G09G 2320/0271; G09G 2330/021; G09G 2360/16; G09G 2300/0861;
(Continued)

(56) References Cited

U.S. PATENT DOCUMENTS

2007/0092136 A1 4/2007 Zhao et al.

OTHER PUBLICATIONS

English translation of the Written Opinion of the International Searching Authority dated May 11, 2018 for corresponding International Application No. PCT/FR2018/050115, filed Jan. 17, 2018.

(Continued)

*Primary Examiner* — Samira Monshi
(74) *Attorney, Agent, or Firm* — David D. Brush; Westman, Champlin & Koehler, P.A.

(57) ABSTRACT

A method for processing at least one digital image for reproduction on a display device. The image includes image elements, an image element being associated with color information having, in a first color space, a luminance component and chrominance components. The method includes the following acts: determining a number of image elements, known as "bright" elements, at least the luminance component of which has a value greater than a first predetermined threshold; evaluating a maximum tolerated brightness value as a decreasing function of the number of counted image elements; and transforming the first luminance components of the image elements to second luminance components, including for an image element, calculating an intermediate luminance value by applying an expansion exponent to the first luminance component value and multiplying the intermediate value calculated by the evaluated maximum tolerated luminosity value.

11 Claims, 6 Drawing Sheets

(51) Int. Cl.
*H04N 5/57* (2006.01)
*H04N 9/67* (2006.01)
*H04N 9/68* (2006.01)

(52) U.S. Cl.
CPC ..... *H04N 9/68* (2013.01); *G06T 2207/10024* (2013.01); *G06T 2207/20208* (2013.01)

(58) Field of Classification Search
CPC ......... G09G 2320/0247; G09G 3/3241; G09G 2300/0452; G09G 2300/0842; G09G 2310/0235; G09G 2310/0248; G09G 2310/0251; G09G 2310/0297; G09G 2320/0261; G09G 2320/0276; G09G 2320/0626; G09G 2320/064; G09G 2320/066; G09G 3/2014; G09G 3/22; G09G 3/325; G09G 3/3266; G09G 3/3283; G09G 3/2022; G09G 3/3426; G09G 2320/0233; G09G 2320/0285; G09G 2320/029; G09G 2320/041; G09G 2320/043; G09G 2320/0646; G09G 2320/0666; G09G 2320/0693; G09G 2330/02; G09G 2330/028; G09G 2360/145; G09G 3/3225; G09G 3/3275; G09G 3/3413; G09G 3/342; G09G 5/006; G09G 2300/043; G09G 2320/0266; G09G 2320/0673; G09G 2320/08; G09G 2340/06; G09G 3/2018; G09G 3/2051; G09G 3/2922; G09G 3/293; G09G 3/294; G09G 3/3233; G09G 3/3258; G09G 3/3406; H04N 1/4092; H04N 1/56; H04N 5/21; H04N 5/253; H04N 17/002; H04N 3/36; H04N 5/20; H04N 5/202; H04N 5/2256; H04N 5/243; H04N 9/11
See application file for complete search history.

(56) References Cited

OTHER PUBLICATIONS

Bist et al., "Tone Expansion using Lighting Style Aesthetics", Computers and Graphics, vol. 62, Dec. 15, 2016 (Dec. 15, 2016), pp. 77-86, XP029900476.
French Search Report and Written Opinion dated Jun. 13, 2017 for corresponding French Application No. 1750937, filed Feb. 3, 2017.
International Search Report dated Apr. 25, 2018 for corresponding International Application No. PCT/FR2018/050115, Filed Jan. 17, 2018.
Written Opinion of the International Searching Authority dated Apr. 25, 2018 for corresponding International Application No. PCT/FR2018/050115, filed Jan. 17, 2018.
Erik Reinhard et al, entitled "Photographic tone reproduction for digital images," published in ACM Transactions on Graphics, vol. 21, No. 3, pp. 267-276, in 2002.
David Hasler et al, entitled "Measuring colorfulness in natural images," published in Electronic Imaging 2003. International Society for Optics and Photonics, 2003, pp. 87-95.
Fairchild et al, in the book entitled "Color Appearance Models", published by John Wiley and Sons Ltd in 2005, p. 93-94, section 4.8 "Definitions in Equations".
Bist et al., "Style Aware Tone Expansion for HDR Displays", Graphics Interface, Jun. 1, 2016 (Jun. 1, 2016), pp. 57-63, XP055377981.

METHOD FOR PROCESSING AN INPUT IMAGE, DEVICE, TERMINAL EQUIPMENT AND ASSOCIATED COMPUTER PROGRAM

1. CROSS-REFERENCE TO RELATED APPLICATIONS

This application is a Section 371 National Stage Application of International Application No. PCT/FR2018/050115, filed Jan. 17, 2018, the content of which is incorporated herein by reference in its entirety, and published as WO 2018/142040 on Aug. 9, 2018, not in English.

2. FIELD OF INVENTION

The field of invention is the processing of digital images and digital image sequences whose color information is represented in a first interval of values, with a view to their reproduction on a display device capable of representing them in a second interval of values, greater than the first.

In particular, but not exclusively, the invention may apply to the conversion of color intensities of digital images represented in a standard or SDR (Standard Dynamic Range) format for restitution on a display device in accordance with an HDR (High Dynamic Range) format.

3. DESCRIPTION OF THE RELATED ART

Today, we are seeing the emergence of a new generation of audiovisual content delivery devices, such as televisions, known as HDRs, which are capable of displaying images with a wide range of color intensities. These displays offer a high peak brightness level and increased contrast levels between the dark and bright areas of the image, providing the user with an unparalleled proximity to reality.

Currently, this technology still coexists with the SDR format, which remains the reference for the transmission of audiovisual content, so to take advantage of the increased capabilities of an HDR screen, it is necessary to convert the received SDR content to HDR format before displaying it.

The article by Bist et al, entitled "Style Aware Tone Expansion for HDR Displays", published by the Graphics Interface conference, held in Canada in June 2016, is known as a method of expanding the color intensities of an input digital image, based on an expansion exponent calculated as a decreasing function of an overall image brightness level.

More precisely, this method consists in calculating the luminance component of the output image as follows:

$$Y_2 = L_{MAX} \cdot Y_1^\gamma \text{ with } \gamma = 1 + \log_{10} \frac{1}{L_{med,n}^*} \quad (1)$$

where $Y_1$ denotes the luminance component of the input image, $Y_2$ the luminance component of the output image, $\log_{10}$ the decimal logarithm, $\gamma$ an expansion exponent applied to the luminance component Y1 and $L_{med,n}^*$ a standardized and clipped median luminance value and $L_{MAX}$ the maximum value of the luminance component allowed by the HDR format playback device.

An advantage of this solution is that it allows a faithful rendering of the image lighting style while remaining simple to implement using limited computing resources compatible with real-time processing requirements.

4. DISADVANTAGES OF THE PRIOR ART

A disadvantage of this method is that it does not take into consideration the visual comfort of an observer of the image displayed on the display device.

5. SUMMARY

An aspect of the present disclosure relates to a method for processing at least one digital image for reproduction on a display device, said image comprising image elements, an image element being associated with color information comprising, in a first color space, a luminance component and chrominance components, said luminance component having a value within a first interval of predetermined values, said device being capable of restoring luminance values within a second interval of predetermined values, of a length greater than that of the first interval, said method comprising the following steps:

Counting a number of image elements, known as "bright" elements, at least the luminance component of which has a value greater than a first predetermined threshold;

Evaluating a maximum tolerated brightness value as a decreasing function of the number of counted pixels; and Transforming the first luminance components of the pixels to second luminance components, comprising for an pixel of the image, calculating an intermediate luminance value by applying an expansion exponent to the first luminance component value and multiplying the intermediate value calculated by the evaluated maximum tolerated luminosity value.

The invention thus makes it possible to control the range of possible luminance values in the second range of values, based on a quantity of bright image elements present in the image. Contrary to the previous art, it proposes to limit this range of values all the more as the quantity of these image elements is important, in order to limit the ocular discomfort perceived by a user who visualizes the displayed image.

Depending on one aspect of the invention, the step of counting "bright" elements also comprises the following steps:

Converting color information components into a second color space, including a luminance component and a color saturation component;

Scanning the image elements comprising, for an image element, the following sub-steps:

Comparing the luminance component to the first threshold;

When the luminance component is above the first threshold, comparison of a product of the luminance component and the saturation component to a second threshold and a third threshold below the second;

Increasing the number of "bright" image elements when the product is below the second threshold or above the third threshold.

An advantage of this first mode of realization is that it takes into consideration not only very "white" pixels, but also pixels that are both light and colorful.

According to another aspect of the invention, the counting step comprises scanning the elements of the image, and, for a current image element comprising a vector of color information components, the following sub-steps:

Searching in a table for information representative of a "bright" character of the combination of values of color information components corresponding to that of the vector of the current element; and In case this information has been found, incrementing a number of "bright" elements in the image.

A first advantage of this mode of realization is that it avoids conversion into the HSV color space, the processed data being the components of RGB color intensities. A second advantage is that the segmentation of color intensity combinations corresponding to "bright" elements is done once and for all when the table is created and that the computational complexity of image processing is then reduced.

According to another aspect of the invention, the process comprises a preliminary phase of constructing the table from a set comprising all possible combinations of values of the color information components, said phase comprising the following steps:
  Conversion of color information components into a second color space, comprising a luminance component and a color saturation component;
  Scanning the combinations, comprising, for a current combination, the following steps:
    Comparing the luminance component to a first threshold;
    When the luminance component is above the first threshold, comparing a product of the luminance component and the saturation component to a second threshold and a third threshold below the second;
    When the product is below the second threshold or above the third threshold, recording in the table information representative of a "bright" character of the current combination.

The segmentation of the "bright" elements is performed as in the previous realization mode, but once and for all, on a large test image, including all possible combinations of color intensity values. This method of realization may be advantageous when the equipment that implements the invention has sufficient memory capacities, but limited computing capacities.

According to another aspect of the invention, the maximum tolerated brightness value is calculated as follows:

$$L'_{max} = \frac{L_{crit}}{NP_B^\mu}$$

where $L_{crit}$ denotes a preferred minimum luminance value for an image comprising a number of bright pixels greater than 95%, p a real constant such that $0<\mu<1$ and $NP_B$ the normalized number of determined bright pixels, ranging from 0 to 1.

One advantage of this method of implementation is that it is simple to implement.

The following different modes or characteristics of implementation may be added independently or in combination with each other to the characteristics of the method for processing an image or a sequence of images defined above.

The invention also concerns a device for processing an image or a sequence of images adapted to implement the method according to any of the particular embodiments defined above. This device may of course include the different characteristics relating to the processing method depending on the invention. Thus, the characteristics and advantages of this device are the same as those of the processing method and are not further detailed.

Correlatively, the invention also concerns a terminal equipment capable of and configured to obtain a sequence of digital images and to transmit a sequence of digital images to a display device (20) capable of and configured to restore it, characterized in that said equipment includes a device for processing at least one digital image according to the invention.

The invention also concerns a computer program with instructions for carrying out the steps of a processing method as described above, when this program is executed by a processor.

These programs can use any programming language. They can be downloaded from a communication network and/or recorded on a computer-readable medium.

Finally, the invention refers to recording media, readable by a processor, whether or not integrated into the device for processing an image or a sequence of images and the device for processing according to the invention, which may be removable, respectively storing a computer program implementing a processing method, as described above.

6. LIST OF FIGURES

Other features and advantages of the invention will appear more clearly on reading the following description of an embodiment of the invention, given as a simple illustrative and non-limiting example, and the appended drawings among which:

FIG. 1 schematically shows a processing chain for an input image or an input image sequence in SDR format capable of providing an output image or an output image sequence in HDR format;

Figure 4:
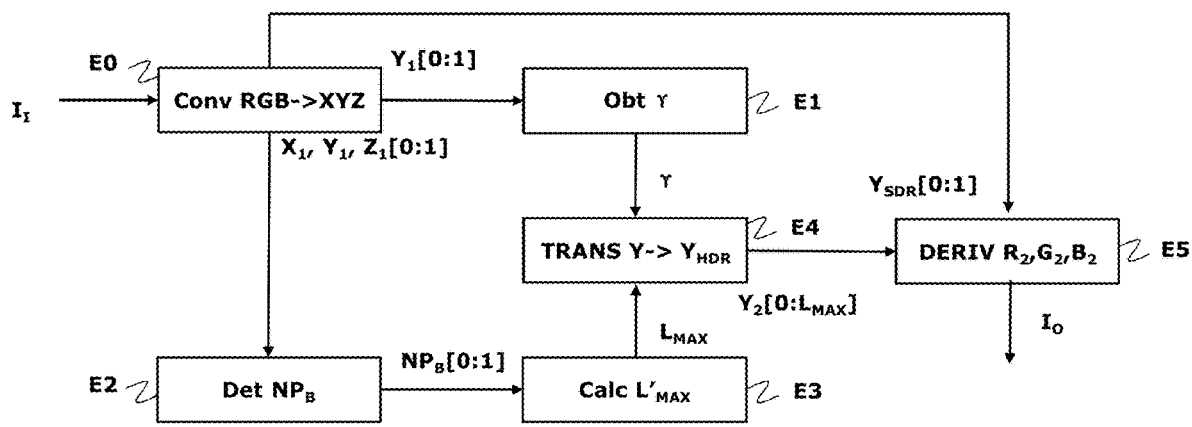
Figure 5:
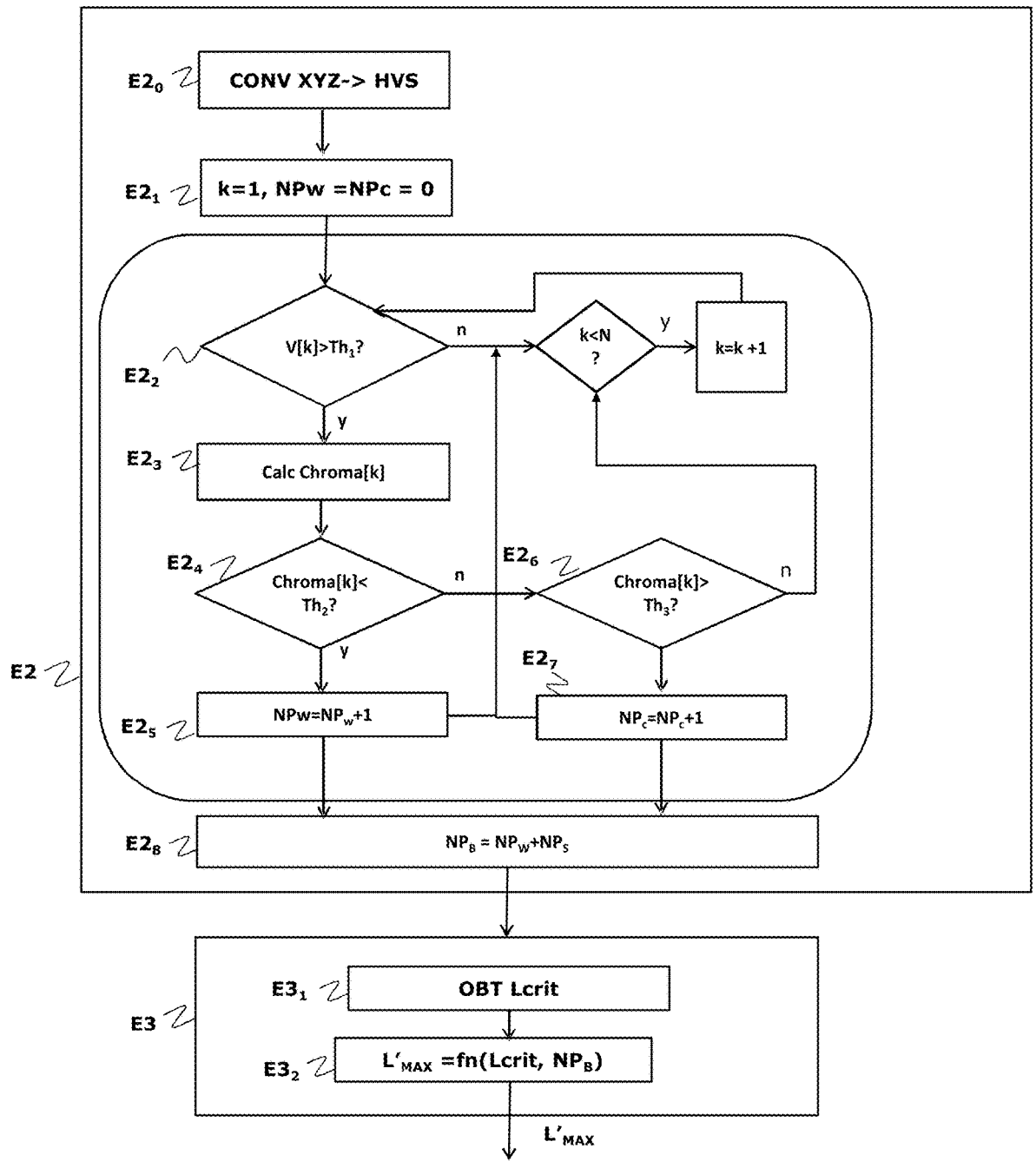
Figure 6:
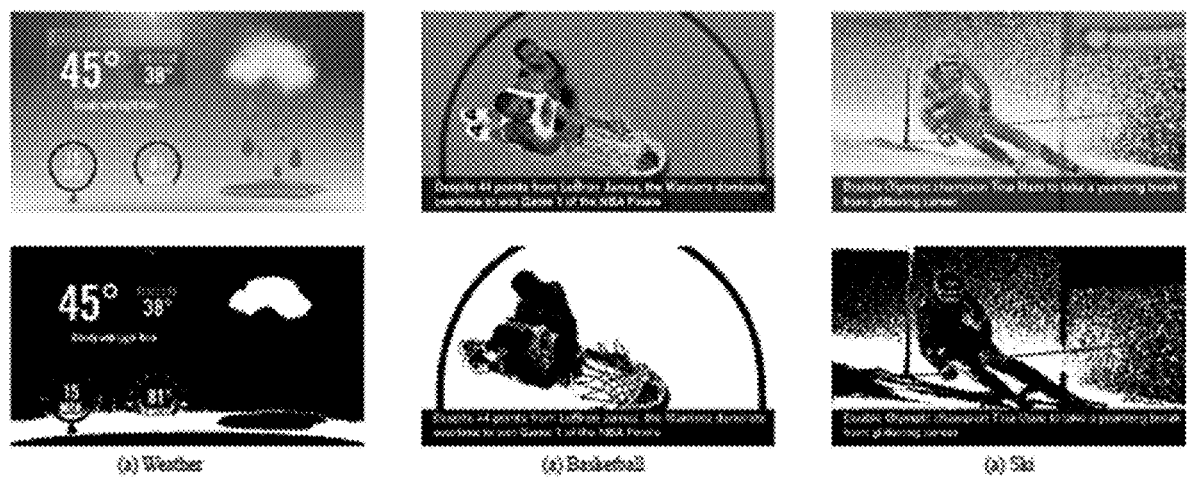
Figure 8:
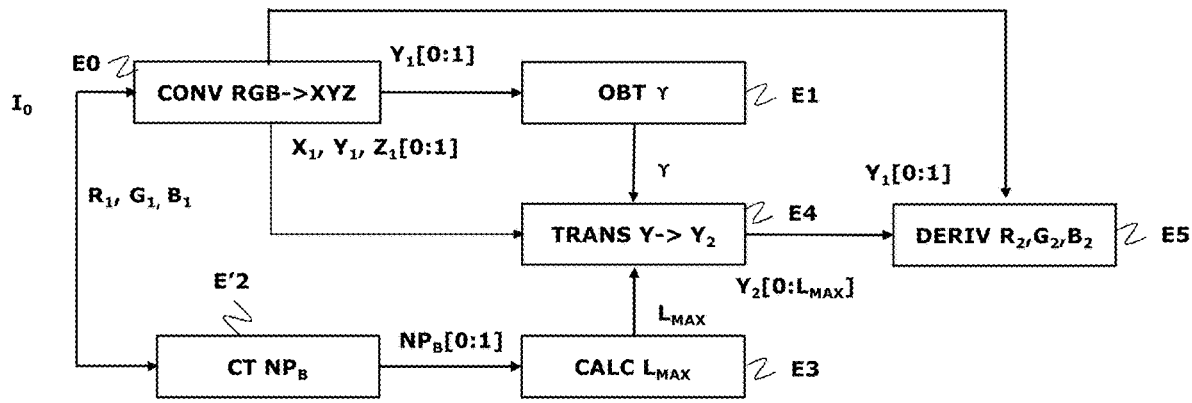
Figure 9:
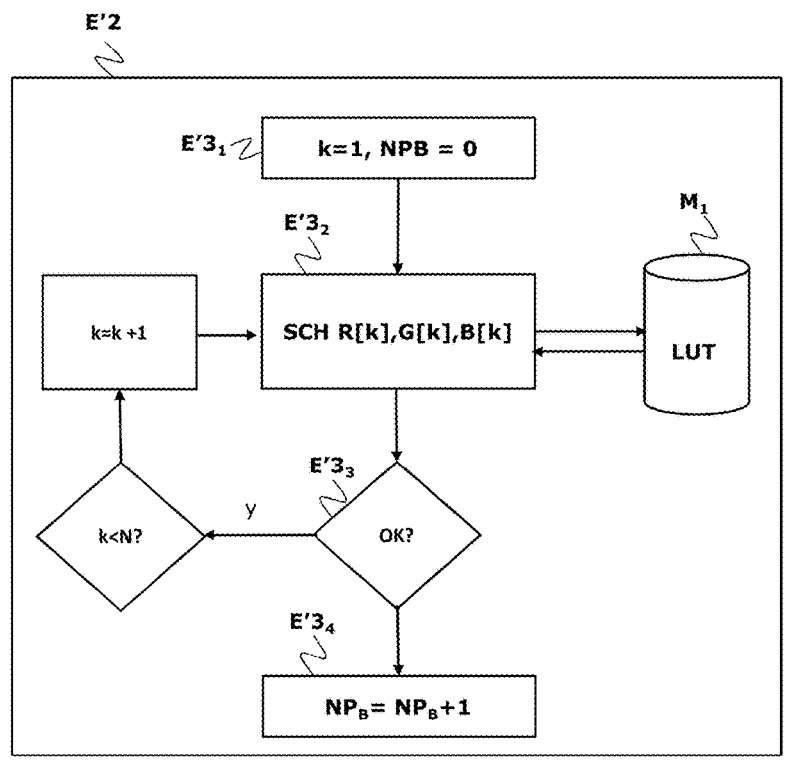
Figure 10:
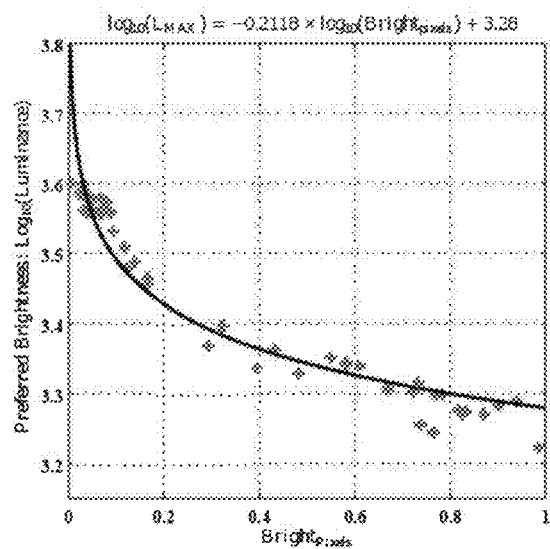
Figure 11:
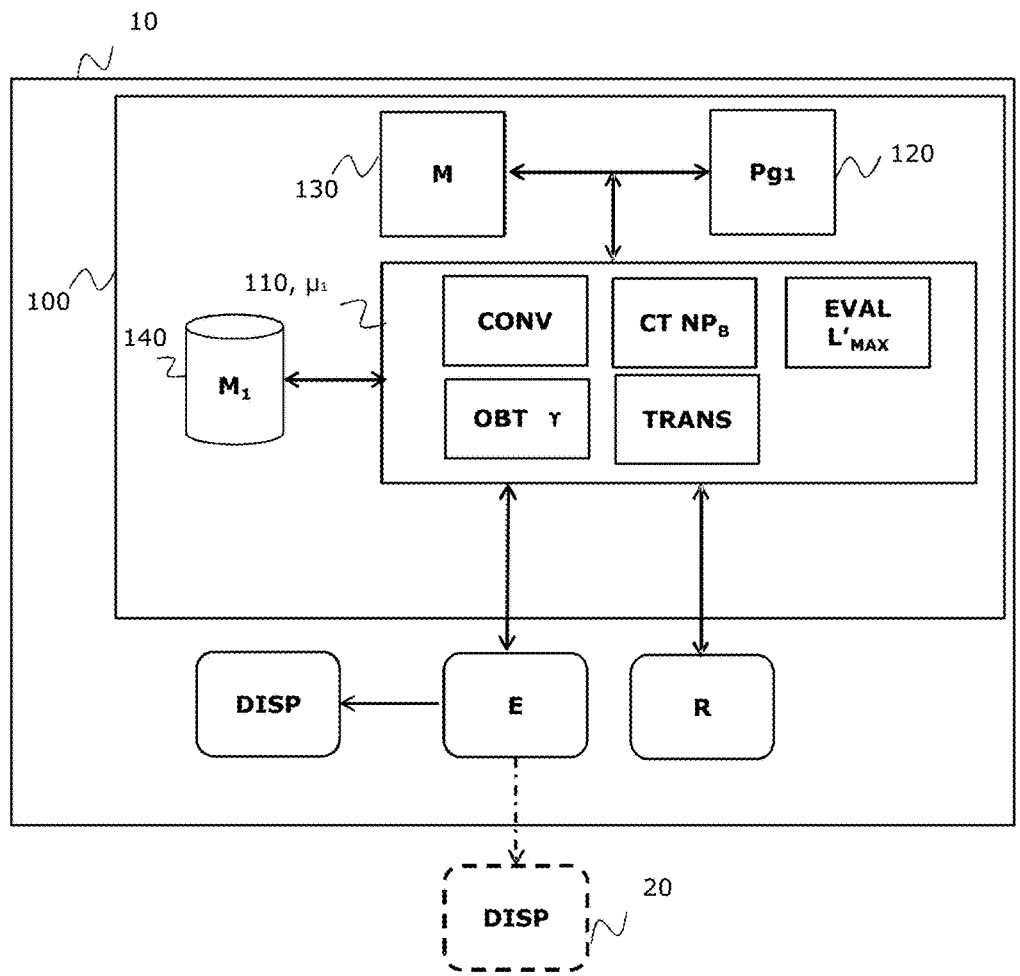

FIG. 4 schematically presents the steps of a method for processing an input image or a sequence of input images according to the invention;

FIG. 5 describes in more detail the steps of counting a number of "bright" image elements likely to cause discomfort to the user, and calculating a maximum tolerated brightness value based on this number of elements, according to a first embodiment of the invention;

FIG. 6 shows examples of segmentation of "bright" image elements that may cause discomfort to the user, depending on the invention;

FIGS. 7A to 7D show a location of the "bright" image elements segmented into representations of the color space used;

FIG. 8 schematically presents the steps of a method for processing an input image or a sequence of input images according to a second embodiment of the invention;

FIG. 9 describes in more detail the steps of counting a number of "bright" image elements that may cause discomfort to the user, according to the second embodiment of the invention;

FIG. 10 shows an evolution curve of a maximum tolerated brightness value as evaluated by the method according to the invention and users' preferred brightness values for a given image, depending on a number of "bright" image elements; and FIG. 11 schematically shows an example of the material structure of an image or image sequence processing device according to an embodiment of the invention.

7. DESCRIPTION OF A PARTICULAR EMBODIMENT OF THE INVENTION

The general principle of the invention is based on the counting of a number of so-called "bright" image elements present in an input image, which may cause discomfort to an observer of the output image rendered on a display device, and on the calculation of a maximum tolerated brightness value as a function of the number of image elements determined. This value is then used to extend the range of color information values of the input image in a controlled way, and obtain an output image, both suitable for the display device and respecting the visual comfort of the observer.

Figure 1:
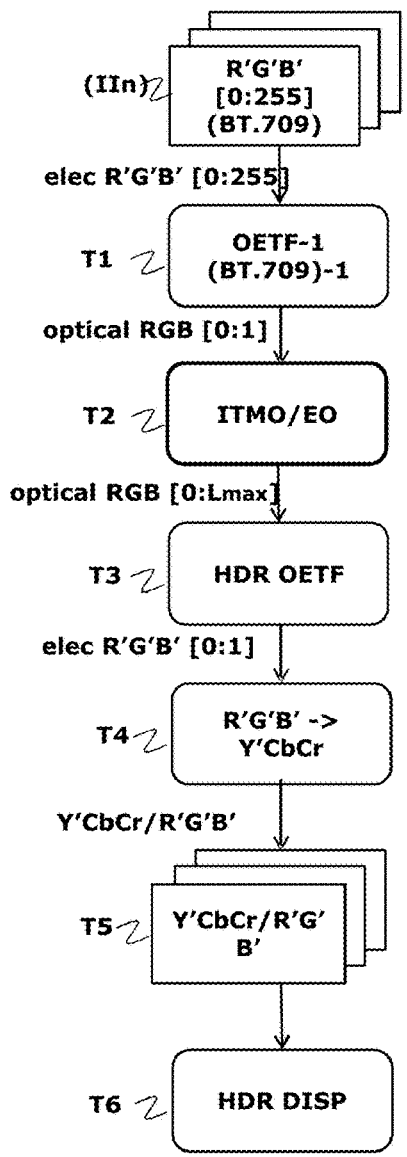

In relation to FIG. 1, a processing string of an input image sequence ($II_n$) in SDR format, with n integer between 0 and N, with N integer not zero, is considered for display in HDR format.

The images in the input sequence are two-dimensional (2D). Their elements are pixels. Of course, the invention is not limited to this example and also applies to three-dimensional (3D) or multi-view images, whose elements are voxels.

The images in this sequence can have different spatial dimensions such as SD (for "Standard Definition"), HD (for High Definition), UHD (for Ultra High Definition), 4K, which is four times the definition of an HD image and 8K, which is sixteen times the definition of an HD image. The input sequence can have various frame rate values among the following values of 24, 25, 30, 30, 50, 60, 120 etc. The color intensities of its image elements can be coded to a bit depth, for example 8, 10, 12 or 16 bits.

It is assumed that this sequence of images was previously obtained either in raw form directly from an acquisition module, such as a video camera, or in decompressed form from a decoder.

For example, the input image sequence ($II_M$), with an integer M corresponding to the number of images in the sequence, is in R'G'B' format (for "Red Green Blue"), as specified in BT.709 standard, which defines the parameter values of HDTV standards for the production and international exchange of audiovisual programmes. The color information is expressed in three components R', G', B', which each take values from 0 to 255, for example, when encoded on 8 bits.

Of course, the invention is not limited to this color space and can also process input images in other formats such as BT.2020, BT.601, DCI-P3, etc.

This R'G'B' color information corresponds to a computer or electrical coding of the colors of the image elements. An optical electrical conversion operation is performed in $T_1$ to restore the optical intensities of the image colors. The RGB optical intensities thus obtained take values between 0 and 1.

These RGB optical intensities are presented, in T2 at an ITMO module (for "Inverse Tone Mapping Operator") whose function it is to extend the range of values of the color intensities from a first interval [0:1] to a second interval of values [0:$L_{MAX}$] where $L_{MAX}$ represents the length of the second interval, $L_{MAX}$ being an integer greater than 1 which corresponds to a brightness scale factor applied to the intensity values of the first interval. According to the previous art, the value of $L_{MAX}$ is equal to the maximum luminance intensity value supported by the display device, which can reach a value of $L_{CAP}$=4000 nits on current TV sets.

This ITMO module implements a processing method that expands the range of color intensities of the first interval to obtain color intensities that can take all the values of the second interval of values. For example, it uses the processing method described in the article by Bist et al. already mentioned and in this case $L_{MAX}$=$L_{CAP}$, or the method according to the invention that will be presented below in relation to FIG. 3. At the output of this module, the sequence of images produced is in RGB optical format with intensities potentially between 0 and $L_{MAX}$.

Each image in the sequence is subjected in T3 to an inverse electrical optical conversion operation in order to obtain an image sequence at the output whose color intensities correspond to a computer code that can be used for a display device, such as a television set. For example, the conversion used provides color intensities in the Y'$C_b$$C_r$ format, which decomposes the color intensities into a luminance component Y' separate from the chrominance components $C_b$, $C_r$. This Y'$C_b$$C_r$ format is a way of representing the color video space typically used in transmission chains. These components are encoded on 10 bits. Alternatively, an additional conversion provides a sequence of output images in R'G'B' format, encoded on at least 10 bits, in T4.

The resulting image sequence is transmitted in T5 to a display device, such as an HDR digital television set that complies with the BT2100 standard.

Figure 2:
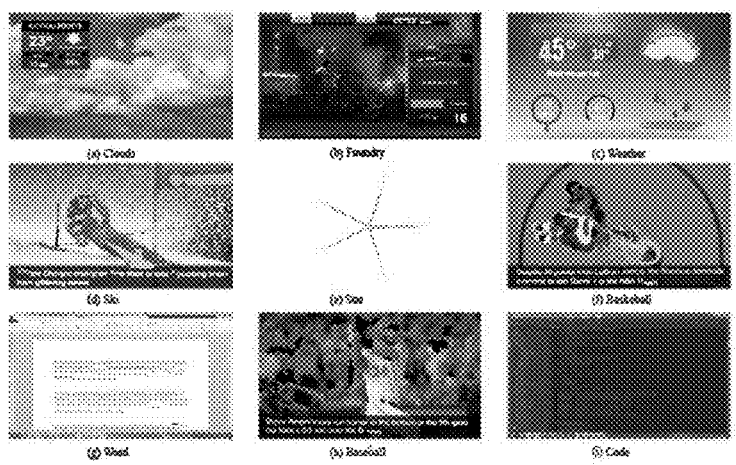
FIG. 2 shows examples of test images used to evaluate a preferred level of brightness perceived by a panel of users.

The results of an experiment conducted by the inventors to evaluate a preferred level of brightness perceived by a panel of test users are presented. Images that have been expanded from SDR to HDR are presented to them. In relation to FIG. 2, a set of test images includes images of various types, such as natural images, synthetic images, text documents, computer graphics, wallpapers etc., with 8-bit Full HD (1920×1080) resolution in the RGB color space. The display device used has a peak $L_{CAP}$ brightness value of 4000 nits. Each image is first displayed with a scale factor $L_{MAX}$=$L_{CAP}$. The test user is asked if he/she finds the image visually comfortable or if it is too bright. If the tester user considers the image too bright, then he is given the opportunity to adjust the scale factor until the brightness level becomes comfortable for him. Then we move on to the next image.

Figure 3:
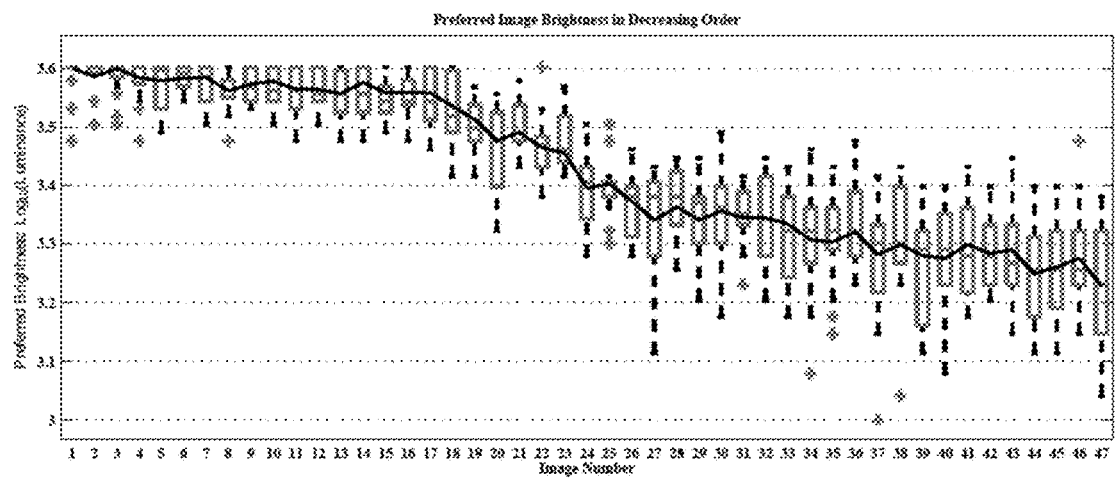
FIG. 3 shows in the form of a box diagram the preferred brightness values of users for a set of tested images.

The results obtained by this study are illustrated by FIG. 3, which shows a graphical representation including, on the abscissa, the image numbers reordered according to a decreasing level of brightness and, on the ordinate, the preferred brightness values of the panel users, notably as a box and whisker plot. A box is obtained by drawing a rectangle from the first quartile to the third quartile through the median, which is represented by a horizontal line. This type of diagram provides a quick way to represent the essential profile of a quantitative statistical series. This representation highlights the fact that the preferred brightness value of users is not always the maximum $L_{CAP}$ luminance value allowed by the display device.

This curve shows that the preferred brightness value of users may be lower than the peak $L_{CAP}$ brightness value allowed by the display device and that it is highly dependent on the content presented to users.

FIG. 3 also shows a curve constructed from the truncated mean values at 5% of the box and whisker plot. The inventors found that this truncated average was a good approximation of a preferred brightness value for the users tested.

To preserve the visual comfort of users, it is therefore essential to control the maximum brightness level of the displayed image with a wider range of color information values than the color intensity range of the input image.

The inventors first tried to model this user-preferred brightness value from input image statistics, such as first-order statistics, such as mean, variance, skewness and kurtosis, in relation to the notion of image key as described in E's document. Reinhard et al, entitled "Photographic tone reproduction for digital images," published in ACM Transactions on Graphics, vol. 21, no. 3, pp. 267-276, in 2002, or statistics related to color, such as lightness or colorfulness, described in the document by D. Hasler et al, entitled "Measuring colorfulness in natural images," published in Electronic Imaging 2003. International Society for Optics and Photonics, 2003, pp 87-95. However, they concluded that these statistics were not useful in effectively modelling the preferred brightness of users for a given image.

They then noticed that the users' preferred brightness value decreased when the number of bright image elements, which could cause user discomfort, increased in the image displayed on the HDR monitor. Based on this finding, they developed a method for processing an input image that expands the range of its color information while controlling the applied brightness scale factor, so as to come as close as possible to this user-preferred brightness value and, in any case, not to exceed a maximum user-tolerated brightness value. This brightness control is based on the evaluation of a number of bright image elements present in the input image.

In relation to FIG. 4, the steps of this method are now described according to a first embodiment of the invention. We consider an input image with N image elements, with N a non-zero integer. For example, this image is in Full HD format and N is 1920×1080.

It is assumed that the optical color intensities of the input image are expressed in RGB format.

In a first step E0, the color intensities of the input image are converted into a color space that includes a luminance component $Y_1$ and chrominance components $X_1$ and $Z_1$. We understand that in this space, we separate information representative of a luminosity of the image in each of its elements, from the so-called chrominance information that defines its color. Note that the value range of the components X, Y and Z is [0:1]. The Y1 component is then used to determine an overall level of brightness of the input image and calculate, in E1, an expansion exponent γ as described in paragraph 3.3 of the article by Bist et al. already mentioned.

During an E2 step, there are a number of image elements, known as $NP_B$ "bright" elements. "Bright" refers to points that may cause eye discomfort to a user.

In relation to FIG. 5, which details the counting step E2 according to the first embodiment of the invention, this set of "bright" image elements includes two subsets:
 so-called "bright white" image elements;
 so-called "bright colored" image elements.

In step $E2_0$, the color intensities of the XYZ format are converted to a color space with at least one color saturation component, such as the Hue Saturation Value or HSV space. It is a color management system with the following components:

A hue component T, coded at an angle corresponding to it on a circle of colors:
 0° or 360° for red;
 60° for yellow;
 120° for green;
 180° for cyan;
 240° for blue;
 300° for magenta;

A saturation component S, which represents an "intensity" of the color:
 it varies from 0 to 100%;
 it is sometimes called "purity";
 the lower the saturation of a color, the more "grayed out" the image and the more dull it appears, it is common to define "desaturation" as the inverse of saturation;

A value component V, which represents a particular luminance value called "brightness" of color:
 it varies from 0 to 100%;
 the lower the value of a color, the darker the color. A value of 0 corresponds to black.

It should be noted that this space was chosen because it allows for quick calculations. Nevertheless, any other color space that includes separate saturation and brightness components can be used, such as the CIE-Lab space. This is a color space for surface colors, defined by the International Commission on Illumination, (CIE), at the same time as the CIE L*u*v*v* color space for colors of light. Based on evaluations of the CIE XYZ system, it was designed to more accurately reflect the differences in color perceived by human vision. In this model, three quantities characterize the colors, the brightness L*, derived from the luminance (Y) of the XYZ evaluation, and two parameters a* and b*, which express the deviation of the color from that of a grey surface of the same brightness, such as the chrominance of an image sequence.

In a sub-step $E2_1$, the N elements of the image are traversed in a predetermined sequence. We consider an index k, with an integer k between 1 and N, which represents a current image element of coordinates (i, j) with an integer i between 1 and 1080 and an integer j between 1 and 1920 and we initialize it to the value k=1.

In $E2_2$, the brightness value V[k] of the current k pixel is compared to a first predetermined threshold $Th_1$. If it is lower, the image element is not considered bright and we move on to the next element.

If it is higher, the following characteristics are calculated in $E2_3$ for the image element k:

$$V_T[k] = \left\{ \begin{array}{c} 1 \, si \, V[k] > Th_1 \\ 0 \end{array} \right\} \quad (2)$$

$$\mathrm{Chroma}[k] = S[k] \cdot V_T[k] \quad (3)$$

The $V_T$ characteristic corresponds to a truncated brightness component, equal to 1 when the value of the brightness component is greater than a predetermined threshold $Th_1$, for example set to 0.8, and otherwise zero.

The "Chroma" characteristic, as defined by Fairchild et al, in the book entitled "Color Appearance Models", published by John Wiley and Sons Ltd in 2005, page 93, section 4.8 "Definitions in Equations", is the product of the saturation S and brightness V components.

According to the invention, this definition applies to the truncated brightness component $V_T$, so that the Chroma value is zero when the brightness V is below the first predetermined threshold $Th_1$.

In this way, image elements that have an intense color (high saturation) but low brightness (V<$Th_1$) are excluded, as they are generally not responsible for eye discomfort to the user. This Chroma characteristic is then used to determine whether the current image element belongs to the group of "bright white" or "bright colored" image elements.

In $E2_4$, the Chroma characteristic[k] is compared to a second predetermined threshold $Th_2$.

A "white" $P_w$ image element is defined as follows:

$$P_w[k] = \left\{ \begin{array}{c} 1 \, si \, \mathrm{Chroma}[k] < Th_2 \\ 0 \, \mathrm{otherwise} \end{array} \right\} \quad (4)$$

For example, the threshold $Th_2$ is 0.1.
If the current image element k satisfies the condition, step $E2_5$ is performed. Otherwise, the following step $E2_5$ is performed, which aims to identify the so-called "coloured" image elements.

A "colored" $P_c$ image element is defined as follows:

$$P_c[k] = \begin{cases} 1 \text{ si } Chroma[k] > Th_3 \\ 0 \text{ otherwise} \end{cases} \quad (5)$$

With $Th_2 < Th_3$.
For example, the threshold $Th_3$ is chosen as 0.8.
If the condition is met in $E2_6$, step $E2_7$ is performed.
In $E2_5$ we therefore increment the $NP_w$ number of "white" elements of the image. During step $E2_7$, an additional "coloured" image element was identified. We therefore increment the $NP_c$ number of "colored" elements of the image.
We then test if there are any image elements left to process. If k<N, increment k by 1 and return to step $E2_2$.
Otherwise, we perform step $E2_8$ which consists in summing the number of "bright white" elements and the number of "bright colored" elements counted for the current image. We obtain a total number of "bright" $NP_B$ elements in the image. The threshold values $Th_1$, $Th_2$ and $Th_3$ given as examples were determined empirically on the basis of visual evaluations carried out by the inventors. They can of course be adjusted according to the color space used.
At the end of this step E2, an $NP_B$ number of "bright" image elements was determined.

In relation to FIG. 6, an example is presented of a segmentation of the "bright" pixels produced by the invention on three images from the test database. Image elements identified as "bright" appear in white, while other pixels have an intensity value corresponding to black.
On the left image ("Weather") which is a computer-generated image, 14% of the pixels are considered "bright". In the middle image ("Basketball"), which shows a basketball player playing on an intense yellow background, 58% of the pixels are segmented as "bright" and in the right image ("Ski") including a skier skiing down a snow-covered slope, 29% of the pixels are segmented as "bright". We verify that the invention makes it possible to count the bright elements on images of various types and that the number of "bright" pixels fluctuates significantly from one type of image to another.

Figure 7:
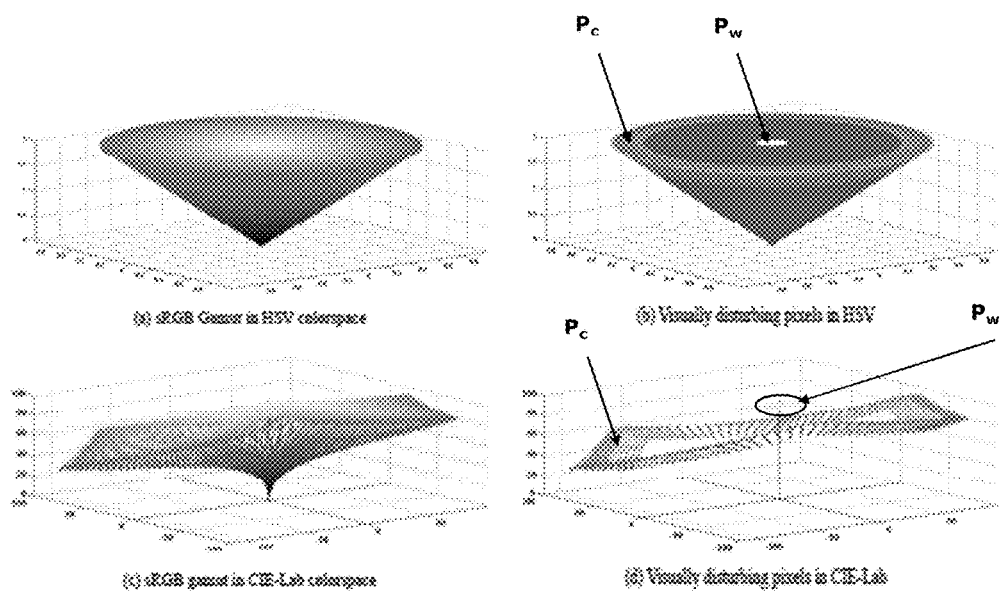

In relation to FIGS. 7A to 7D, the location of the "bright" image elements thus segmented is illustrated, on the one hand in a representation of the HSV color space for FIG. 7B and on the other hand in the CIE-Lab color space for FIG. 7D. In the HSV space, the "bright" elements are in an upper "slice" of the inverted cone of the HSV representation, the "bright white" elements being located around the center and the "bright colored" elements being located on the periphery. Similarly, in the CIE-Lab space, the "bright white" elements are located around the center and the "bright colored" elements form a frame at the periphery of the point cloud.

According to a second embodiment of the invention, which will now be described in relation to FIGS. 8 and 9, the method includes a step E'2 of counting a number of "bright" image elements which takes as input the elements of the image II in RGB format.

This step consists in scanning the K elements of this image and, for a current element k, with k integer less than or equal to K, we search in $E'2_1$, if the combination of its color intensity values ($R_1[k], G_1[k], B_1[k]$) is present in a LUT table previously stored in memory M1. This table stores, for a combination of RGB values, information representative of a "bright" character of this combination.

Depending on the value of the information found in the table, the current element is considered in $E'2_2$ as "bright" and the number of "bright" $NP_B$ elements is increased. Otherwise, we move on to the next element, until all the elements have been scanned.

At the end of this step E2, E'2, we know the number of "bright" $NP_B$ elements present in the image.

A method for creating the LUT table is now described. Advantageously, it is previously constructed from an input data set that includes all possible combinations of RGB intensity values of an image. During a preliminary construction phase, the combinations are examined, and for each of them, it is determined whether the combination of color intensity values corresponds to those of a "bright" element. Advantageously, the procedure is similar to that of step E2 already described in relation to FIG. 5.

We therefore start by converting the combination into the HSV color space. The brightness value V[k] of the current combination is compared to a first predetermined threshold $Th_1$. If it is lower, the combination is not considered to be a "bright" element and the next one is used.

Otherwise, the Chroma[k] characteristic as previously described is calculated and compared to a second and third predetermined threshold $Th_2$ and $Th_3$, with $Th_2 < Th_3$. If the conditions are met (Chroma[k]<$Th_2$ or Chroma[k]>$Th_3$), the combination is considered representative of a "bright" element and this information is inserted into the table. According to a first option, the current combination is stored in the LUT table. Otherwise, the combination is not stored in the list. One advantage of this table is that its dimensions remain compact.

Alternatively, according to a second option, the LUT table takes the form of a large image, three-dimensional in the case of the RGB color space, whose elements take a value for example equal to 1 for a "bright" element and 0 otherwise. For an RGB image whose intensities are encoded on 8 bits, its size is $256^3$. We understand that this image is large and requires significant storage capacity. On the other hand, it allows easy and fast access to the stored information.

In step E3, a maximum tolerated brightness value $L'_{MAX}$ is estimated from this $NP_B$ number obtained.

In order to best control the brightness of the output image ($IO_m$) and to ensure that it corresponds to the users' preferred brightness level, the inventors propose to model a maximum tolerated brightness value as follows:

$$\log_{10}(L'_{MAX}) = -0.2118 \cdot \log_{10}(NP_B) + 3.28 \quad (6)$$

FIG. 10 shows the curve of the values of $\log_{10}(L'_{MAX})$ according to the number of bright points determined NPB. It can be seen that it corresponds well to the truncated mean values of maximum brightness preferred by the test users. More precisely, the goodness of fit is $R^2 = 0.9267$.

This model can be generalized by solving the previous equation. We get:

$$L'_{MAX} = \frac{L_{Crit}}{NP_B^\mu} \quad (7)$$

Where $L_{crit}$ corresponds to a minimum preferred brightness value for a very bright content, comprising for example a number of "bright" $NP_B$ elements greater than 0.95 and ρ is a real constant, chosen equal to 0.2118.

It should be noted that this model makes it possible to predict a maximum tolerated brightness value higher in some cases than the $L_{CAP}$ maximum limit of the display device's value range, for example equal to 4000 nits for a monitor such as the prototype SIM2 HDR47 screen. To avoid that the maximum tolerated brightness level $L'_{MAX}$ tends to infinity, when the number of "bright" image elements tends to zero, the possible $NP_B$ values are limited to the interval [0.001, 1].

In E4, the calculated $L'_{MAX}$ value is used to achieve a range expansion of the luminance values of the input image. For example, as described in the document by Bist et al. already mentioned, they are applied the expansion coefficient γ obtained in E2, according to equation (1), in which the upper limit $L_{MAX}$ of the range of intensity values offered by the display device is replaced by the maximum tolerated brightness value $L'_{MAX}$ evaluated according to the invention:

$$Y_2 = L'_{MAX} \cdot Y_1^\gamma \qquad (1')$$

In E5, the luminance component obtained then derives the luminance intensity values of the output image in the RGB color space, for example as follows:

$$R_2 = \frac{R_1 \cdot Y2}{Y_1} \qquad (8)$$

$$G_2 = \frac{G_1 \cdot Y2}{Y_1} \qquad (9)$$

$$B_2 = \frac{B_1 \cdot Y2}{Y_1} \qquad (10)$$

Where $R_1$, $G_1$, $B_1$ are the color intensity values of the input image ($II_m$) in the RGB color space and $R_2$, $G_2$, $B_2$ are the color intensity values of the output image ($IO_m$).

According to a variant, step E6 includes a sub-step of color component correction, according to which the expansion coefficient applied to an input light intensity value $R_1$, $G_1$, $B_1$ is no longer directly proportional to the ratio $Y_2/Y_1$, as in the previous realization mode, but is a function of the input value of the color component and a saturation factor s, which is a real strictly greater than 1, for example, according to the following expression:

$$R_2 = \left(\left(\frac{R_1}{Y_1} - 1\right) \cdot s + 1\right) Y_2 \qquad (11)$$

$$G_2 = \left(\left(\frac{G_1}{Y_1} - 1\right) \cdot s + 1\right) Y_2 \qquad (12)$$

$$B_2 = \left(\left(\frac{B_1}{Y_1} - 1\right) \cdot s + 1\right) Y_2 \qquad (13)$$

For example, the saturation factor s is chosen for example equal to 1.25.

An advantage of this second correction is that by saturating the intensities of the color components, it allows for a more intense color rendering.

This results in an output image ($IO_m$) whose color intensities take a wider range of values and are adapted to the amplitude offered by the display device, while ensuring the visual comfort of the user.

For a sequence of images, steps E0 to E6 are repeated for each image.

It will be noted that the invention which has just been described can be implemented by means of software and/or hardware components. In this context, the terms "module" and "entity", used in this document, can correspond either to a software component, or to a hardware component, or to a set of hardware and/or software components, capable of implementing the function(s) described for the module or entity concerned.

In relation to FIG. 11, an example of a simplified structure of a device 100 for coding a digital image according to the invention is now presented. Device 100 implements the coding method according to the invention just described.

This FIG. 11 illustrates only one particular way, among several possible ones, to realize the algorithm detailed above. Indeed, the invention technique is carried out indifferently on a reprogrammable computing machine (a PC computer, a DSP processor or a microcontroller) executing a program including a sequence of instructions, or on a dedicated computing machine (for example a set of logic gates such as an FPGA or an ASIC, or any other hardware module).

In the case where the invention is implemented on a reprogrammable computing machine, the corresponding program (i.e. the sequence of instructions) may be stored in a removable storage medium (such as a diskette, CD-ROM or DVD-ROM) or not, which storage medium may be partially or totally readable by a computer or processor.

For example, the device 100 comprises a processing unit 110, equipped with a processor μ1, and driven by a computer program $Pg_1$ 120, stored in a memory 130 and implementing the method according to the invention.

At initialisation, the code instructions of the computer program $Pg_1$ 120 are for example loaded into a RAM before being executed by the processor of the processing unit 110. The processor of the processing unit 110 implements the steps of the method described above, according to the instructions of the computer program 120.

In this embodiment of the invention, the device 100 includes a reprogrammable calculation machine or a dedicated calculation machine, capable of and configured for:
  obtaining an OBT II input image;
  converting CONV the RGB color intensities of the input image into a color space that includes a luminance component Y and chrominance components X and Z;
  Counting CT $NP_B$ a number of image elements, known as "bright" elements, at least the luminance component of which has a value greater than a first predetermined threshold;
  Evaluating a maximum tolerated brightness value as a decreasing function of the number of counted pixels; and
  Transforming TRANS the first luminance components of the pixels to second luminance components, comprising for one pixel of the image, calculating an intermediate luminance value by applying an expansion exponent to the first luminance component value and multiplying the intermediate value calculated by the evaluated maximum tolerated luminosity value.

Advantageously, the calculation machine is configured to implement the embodiments of the invention that have just been described in relation to FIGS. 4, 5, 8 and 9. In particular, in the first embodiment, it converts the components X, Y, Z into brightness and saturation components V and S, compares the component V to a first threshold and the product of V and S to a second and third threshold. In the second embodiment of the invention, it will look for information representative of a "bright" character of the color intensities of the elements of the image, in a LUT table stored in memory.

The 100 device also includes a storage unit $M_1$ 140, such as a memory, for example a buffer memory, capable of storing for example the number of "bright" image elements and the maximum tolerated brightness value $L'_{MAX}$ evaluated. In the second embodiment, it can also store the table LUT.

These units are driven by the processor µ1 of the processing unit 110.

Advantageously, such a device 100 can be integrated into a user terminal UT, for example a decoder, a Set-Top-Box or a digital TV set. The device 100 is then arranged to cooperate at least with the next modules of the terminal TU:

- a data transmitting/receiving E/R module, through which a signal comprising encoded data representative of the input image sequence is received from a telecommunications network, for example a radio, wireline or wireless network; and/or
- a module for acquiring the input image sequence, such as a video camera, for example via an HDMI cable;
- a display device, configured to display images with a wide range of color intensities, such as a prototype SIM2 HDR47 TV with an LCD panel with LCD modulated backlight. It offers a maximum brightness of 4000 nits and a contrast of 20,000:1.

Thanks to its good performance and ease of implementation, the invention just described allows several uses. Its first application is the conversion of video content in SDR format into a version that can be displayed on an HDR playback device, which both preserves the original style of the images and ensures the visual comfort of users. For example, it can be implemented upon receipt of live video content in SDR format as post-processing for display of the image sequence on an HDR screen.

For the production of real-time TV content using multiple acquisition modules, SDR and HDR, it can be used to convert SDR content to HDR on the fly before mixing it with HDR content. It may also prove interesting in post-production filmmaking.

Finally, the invention can be implemented at any point in a transmission chain to transcode content transmitted in HDR BT.709 format into HDR format, as specified by the BT2100 standard.

An exemplary embodiment of the present invention improves the situation discussed with respect to the prior art.

An exemplary embodiment particularly aims to overcome these disadvantages of the prior art.

More precisely, an exemplary embodiment offers a solution for expanding the range of luminance values that preserves the visual comfort of the user.

An exemplary embodiment controls the expansion of the range of color intensities of an image when converting its format in order to take into account a maximum brightness value tolerated by the user.

It goes without saying that the embodiments which have been described above have been given for purely indicative and non-limiting reasons, and that many modifications can easily be made by those skilled in the art without departing from the scope of the invention.

The invention claimed is:

1. A processing method comprising:
   processing at least one digital image for reproduction on a display device, said image comprising image elements, an image element being associated with color information comprising, in a first color space, a luminance component and chrominance components, said luminance component having a value within a first interval of predetermined values, said device being capable of restoring luminance values within a second interval of predetermined values, of a length greater than that of the first interval, said processing comprising the following acts performed by a processing device:
   counting a number of image elements, known as "bright" elements, at least the luminance component of which has a value greater than a first predetermined threshold;
   evaluating a maximum tolerated brightness value as a decreasing function of the number of counted image elements; and
   transforming the first luminance components of the image elements to second luminance components, comprising for an image element, calculating an intermediate luminance value by applying an expansion exponent to the first luminance component value and multiplying the intermediate value calculated by the evaluated maximum tolerated brightness value.

2. The processing method according to claim 1, wherein the counting act further comprises:
   converting color information components into a second color space, comprising a luminance component and a color saturation component;
   scanning the image elements comprising, for an image element, the following sub-acts:
   comparing the luminance component to the first threshold;
   when the luminance component is above the first threshold, comparing a product of the luminance component and the saturation component to a second threshold and to a third threshold above the second threshold;
   increasing the number of "bright" image elements when the product is below the second threshold or above the third threshold.

3. The processing method according to claim 1, wherein the counting act comprises scanning the elements of the image, and, for a current image element comprising a vector of color information components, the following sub-acts:
   searching a table for a combination of color information component values corresponding to that of the current element vector, said table for combinations of color information component values associated with "bright" image elements; and
   in case the combination of values of the color information component values of the current element has been found, increment a number of "bright" elements in the image.

4. The processing method according to claim 3, further comprising a preliminary phase of constructing the table from a set comprising all possible combinations of values of the color information components, said phase comprising the following acts:
   converting the color information components into a second color space, including a luminance component and a color saturation component;
   scanning the combinations, including, for a current combination, the following acts:
   comparing the luminance component to a first threshold;
   when the luminance component is above the first threshold, comparing a product of the luminance component and the saturation component to a second threshold and a third threshold below the second;

when the product is below the second threshold or above the third threshold, recording in the table information representative of a "bright" character of the current combination.

5. The processing method according to claim 1, wherein the maximum tolerated brightness value is calculated as follows:

$$L'_{MAX} = \frac{L_{crit}}{P_B^\mu}$$

where $L_{crit}$ denotes a preferred minimum luminance value for an image comprising a number of bright pixels greater than 95%, μ a real constant such that 0<μ<1 and $P_B$ the normalized number of determined bright pixels, ranging from 0 to 1.

6. A device for processing at least one digital image for reproduction on a display device, said image comprising image elements, an image element being associated with color information comprising, in a first color space, a luminance component and chrominance components, said luminance component having a value within a first interval of predetermined values, said device being capable of restoring luminance values within a second interval of predetermined values, of a length greater than that of the first interval, and comprising:
a reprogrammable calculation machine or a dedicated calculation machine, capable of and configured to:
counting a number of image elements, known as "bright" elements, at least the luminance component of which has a value greater than a first predetermined threshold;
evaluating a maximum tolerated brightness value as a decreasing function of the number of counted image elements; and
transforming the first luminance components of the pixels to second luminance components, comprising for one pixel of the image, calculating an intermediate luminance value by applying an expansion exponent to the first luminance component value and multiplying the intermediate value calculated by the evaluated maximum tolerated brightness value.

7. The device according to claim 6, wherein the device is a piece of terminal equipment capable of and configured to obtain a sequence of digital images and transmit a sequence of digital images to the display device, which is capable of and configured to restore the sequence of digital images.

8. A computer-readable and non-transitory storage medium storing a computer program product comprising instructions for implementing a processing method, when said program is executed by a processor of processing device, wherein the instructions configure the processing device to:
process at least one digital image for reproduction on a display device, said image comprising image elements, an image element being associated with color information comprising, in a first color space, a luminance component and chrominance components, said luminance component having a value within a first interval of predetermined values, said device being capable of restoring luminance values within a second interval of predetermined values, of a length greater than that of the first interval, said processing comprising:
counting a number of image elements, known as "bright" elements, at least the luminance component of which has a value greater than a first predetermined threshold;
evaluating a maximum tolerated brightness value as a decreasing function of the number of counted image elements; and
transforming the first luminance components of the image elements to second luminance components, comprising for an image element, calculating an intermediate luminance value by applying an expansion exponent to the first luminance component value and multiplying the intermediate value calculated by the evaluated maximum tolerated brightness value.

9. The processing method according to claim 1, further comprising:
transmitting at least one image of an image sequence to the display device, as a function of the processed at least one digital image.

10. The device for processing according to claim 6, wherein the device for processing is further configured to transmit at least one image of an image sequence to the display device, as a function of the processed at least one digital image.

11. The computer-readable and non-transitory storage medium according to claim 8, wherein the instructions further configure the processing device to:
transmit at least one image of an image sequence to the display device, as a function of the processed at least one digital image.

* * * * *